US008744395B1

(12) United States Patent
Mitchell (10) Patent No.: US 8,744,395 B1
(45) Date of Patent: Jun. 3, 2014

(54) SYSTEM AND METHOD FOR MITIGATING RADIO FREQUENCY INTERFERENCES

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 789 days.

(21) Appl. No.: 12/854,656

(22) Filed: Aug. 11, 2010

(51) Int. Cl.
*H04B 1/10* (2006.01)
*H04B 1/06* (2006.01)

(52) U.S. Cl.
USPC .................. 455/297; 455/242.1; 455/242.2; 455/276.1; 455/304

(58) Field of Classification Search
USPC ............... 455/297, 448, 501, 504, 506, 63.1, 455/63.4, 65, 67.11, 67.13, 67.16, 98, 455/114.2, 129, 152.1, 242.1, 242.3, 243.1, 455/276.1, 278.1, 296, 304, 242.2, 303, 305
See application file for complete search history.

(56) References Cited

U.S. PATENT DOCUMENTS

| | | | | |
|---|---|---|---|---|
| 5,125,108 | A * | 6/1992 | Talwar .................... | 455/278.1 |
| 6,218,984 | B1 * | 4/2001 | Longaker et al. ........ | 342/357.27 |
| 6,313,783 | B1 * | 11/2001 | Kuntman et al. ............ | 342/32 |
| 6,473,596 | B1 * | 10/2002 | Stamper et al. ............ | 455/63.1 |
| 6,614,387 | B1 * | 9/2003 | Deadman ................... | 342/70 |
| 6,791,491 | B2 * | 9/2004 | Talvitie ................... | 342/357.59 |
| 6,963,301 | B2 * | 11/2005 | Schantz et al. .............. | 342/125 |
| 8,018,371 | B1 * | 9/2011 | Paschen et al. .............. | 342/90 |
| 8,090,337 | B2 * | 1/2012 | Apostolos et al. ........... | 455/63.1 |
| 8,373,591 | B2 * | 2/2013 | Margolin ...................... | 342/30 |
| 2012/0252349 | A1 * | 10/2012 | Kolinko et al. ................ | 455/1 |
| 2013/0102254 | A1 * | 4/2013 | Cyzs et al. ................... | 455/63.1 |
| 2013/0147672 | A1 * | 6/2013 | Desclos et al. ................ | 343/745 |

OTHER PUBLICATIONS

Shahriar, Chowdhury M.R., "Mitigation of Interference From Iridium Satellites by Parametric Estimation and Subtraction"; 111 pages; Dec. 1, 2006, Master of Science Thesis, Blacksburg, Virginia, 2006.
Kub, F.J., et al., "Self-Calibrating Hybrid Analog CMOS Co-Site Interference Canceller"; 5 pages; IEEE, 1999.

* cited by examiner

*Primary Examiner* — Pablo Tran
(74) *Attorney, Agent, or Firm* — Donna P. Suchy; Daniel M. Barbieri (57) ABSTRACT

A system for mitigating radio frequency (RF) interferences. The system may comprise an interference cancellation module communicatively coupled with a first antenna, the interference cancellation module configured for mitigating interferences from a second antenna by phase shifting a signal receivable at the first antenna according to a phase shift value, the phase shift value being predetermined when the second antenna is oriented in an initial directional orientation. The system may further comprise a variable RF delay module communicatively coupled with the interference cancellation module, the variable RF delay module configured for determining a current directional orientation of the second antenna, the variable RF delay module further configured for providing a phase compensation value based upon the current directional orientation of the second antenna. The interference cancellation module may be further configured for phase shifting the signal receivable at the first antenna according to the phase compensation value.

6 Claims, 9 Drawing Sheets

SYSTEM AND METHOD FOR MITIGATING RADIO FREQUENCY INTERFERENCES

TECHNICAL FIELD

The present disclosure relates generally to radio frequency interference mitigation and more particularly to an interference mitigation system utilized on a vehicle.

BACKGROUND

Radio Frequency (RF) communication systems are utilized in various environments. Radio frequency interferences may occur in such systems and may interrupt, obstruct, or otherwise degrade or limit the effective performance of the communication. For example, cosite interferences may occur in RF communication systems having two or more transmitters/antennas installed nearby and using frequency bands that are relatively close to interfere with each other. In another example, radio signals reflected from objects located in proximity to the transmitters/antennas may also produce interferences.

SUMMARY

The present disclosure is directed to a system for mitigating RF interferences. The system may comprise an interference cancellation module communicatively coupled with a first antenna, the interference cancellation module configured for mitigating interferences from a second antenna by phase shifting a signal receivable at the first antenna according to a phase shift value, the phase shift value being predetermined when the second antenna is oriented in an initial directional orientation. The system may further comprise a variable RF delay module communicatively coupled with the interference cancellation module, the variable RF delay module configured for determining a current directional orientation of the second antenna, the variable RF delay module further configured for providing a phase compensation value based upon the current directional orientation of the second antenna. The interference cancellation module may be further configured for phase shifting the signal receivable at the first antenna according to the phase compensation value.

A further embodiment of the present disclosure is directed to a method for mitigating interferences in an RF communication system. The RF communication system may include a first antenna and a second antenna. The method may comprise providing a phase shift value, the phase shift value being configured for mitigating interferences from the second antenna when the second antenna is oriented in an initial directional orientation; determining a current directional orientation of the second antenna; providing a phase compensation value based upon the current directional orientation of the second antenna; and phase shifting a signal receivable at the first antenna according to the phase shift value and the phase compensation value.

An additional embodiment of the present disclosure is directed to a method for mitigating interferences in an RF communication system. The RF communication system may include a first antenna and a second antenna. The method may comprise determining a first directional orientation of the second antenna; providing a first RF delay value based upon the first directional orientation of the second antenna; phase shifting a first signal receivable at the first antenna according to the first RF delay value; determining a second directional orientation of the second antenna, the second directional orientation being different from the first directional orientation; providing a second RF delay value based upon the second directional orientation of the second antenna; and phase shifting a second signal receivable at the first antenna according to the second RF delay value.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Figure 1:
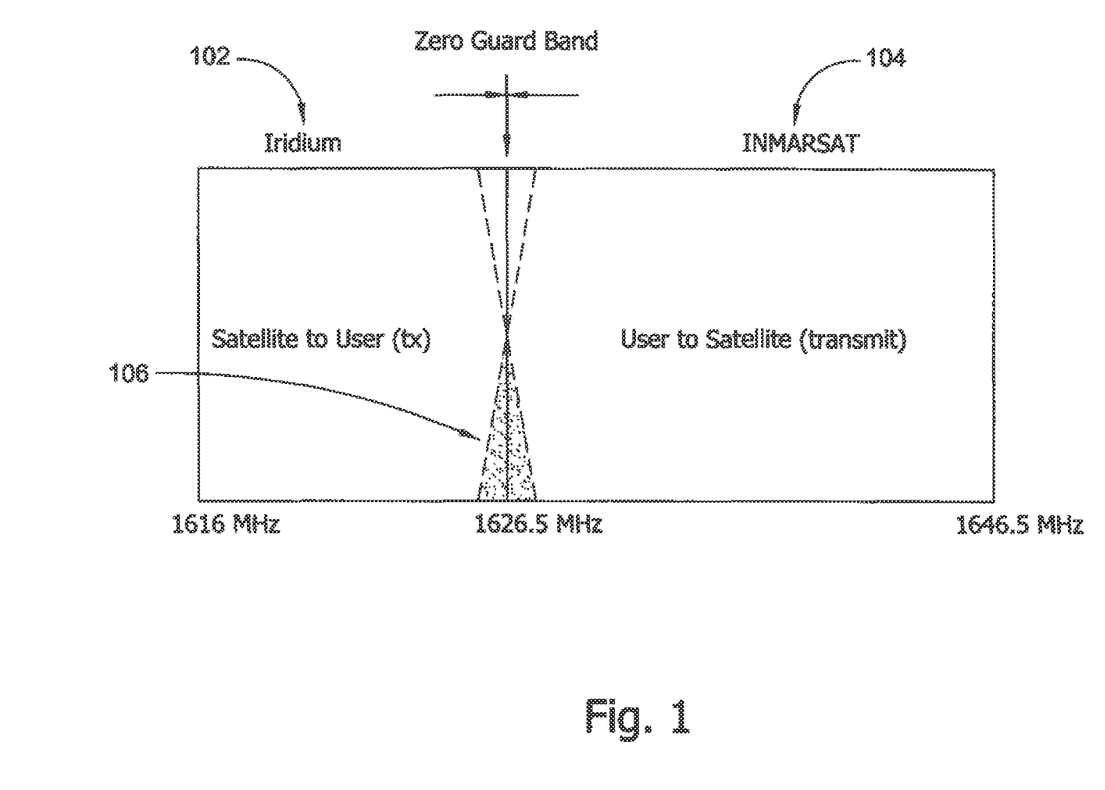
FIG. 1 illustrates potential cosite interferences between two co-located radio systems.

Cosite (adjacent band) interferences may occur in RF communication systems having two or more transmitters/antennas installed nearby and using frequency bands that are relatively close to interfere with each other. Referring to FIG. 1, a diagram illustrating potential cosite interferences is shown. For example, the communication system of an aircraft may utilize both IRIDIUM radio 102 and INMARSAT radio 104. Since IRIDIUM and INMARSAT operate in frequency bands that are exactly next to each other, RF spill over 106 may occur, and the "guard band" between the IRIDIUM and INMARSAT may be limited and may not be enough to separate the radios from interfering.

Figure 2:
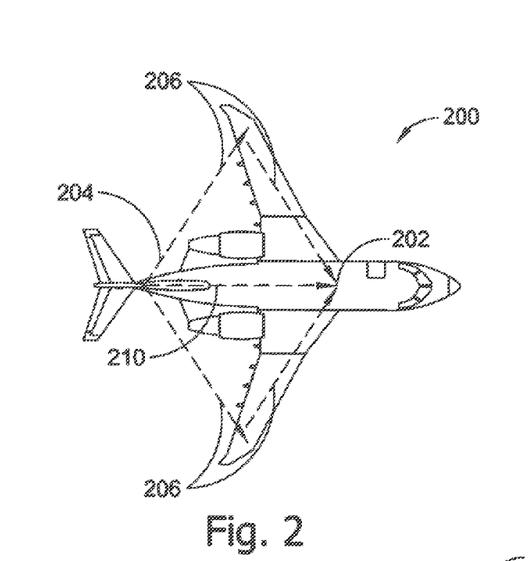
FIG. 2 is a top view of an aircraft illustrating various types of potential interferences between two co-located radio systems.
Figure 3:
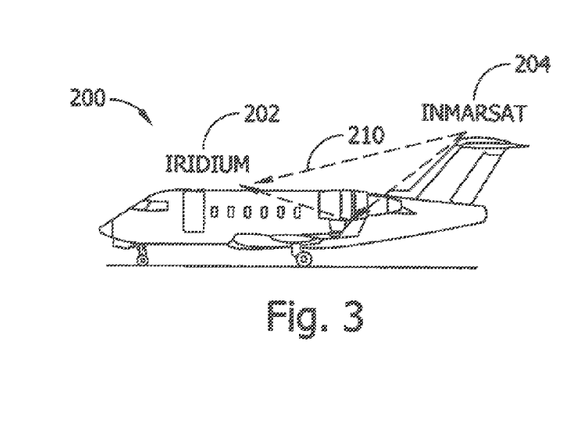
FIG. 3 is a side view of an aircraft illustrating various types of potential interferences between two co-located radio systems.
Figure 4:
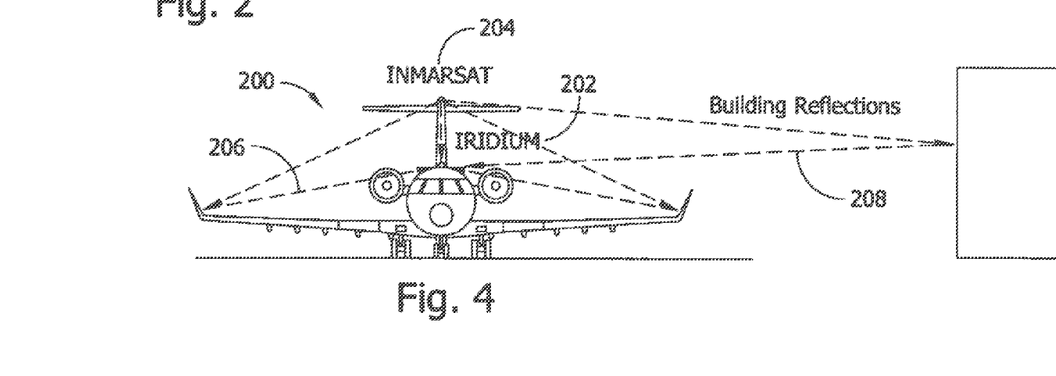
FIG. 4 is a front view of an aircraft illustrating various types of potential interferences between two co-located radio systems.

Radio signals reflected from objects located in proximity to the transmitters/antennas may also produce interferences. Referring to FIGS. 2 through 4, diagrams illustrating such interferences are shown. For example, an aircraft 200 may include a first radio 202 and a second radio 204. Radio signals transmitted by the second radio 204 may be reflected off of certain parts of the aircraft body (e.g., the wings as depicted in the figures) and interfere with the signals received at the first radio 202. This type of interferences may be referred to as reflected aircraft interference 206. In addition, radio signals transmitted by the second radio 204 may also be reflected off of nearby structures (e.g., building reflections during taxing) and interfere with the signals received at the first radio 202. This type of interferences may be referred to as reflected structure/ground interference 208. FIGS. 2 through 4 further illustrate direct transmitter to transmitter interferences 210, which may be referred to as the cosite interference described above.

Cosite mitigation/cancellation technologies may be utilized to mitigate cosite interferences. An exemplary cosite mitigation system is disclosed in: *Self-calibrating Hybrid Analog CMOS Co-site Interference Canceller*, F. J. Kub et al., Military Communications Conference Proceedings, 1051-1054 vol. 2 (1999), which is herein incorporated by reference in its entirety. Such a cosite mitigation system may be configured to apply a phase shift value to the signals received at the first radio 202 to cancel the cosite interferences caused by the second radio 204. The phase shift value may be determined by sampling the output of the second radio 204 (the interferer in this example) and matching the output in time delay with the input of the first radio 202. Once the phase shift value is determined (i.e., a fixed delay value), phase shifting may be implemented using a delay line/circuit, which phases the two signals so that the cosite mitigation system can apply its multipliers, integrators (LMS), and/or attenuators to enable cancellation of in-band interferers.

Figure 5:
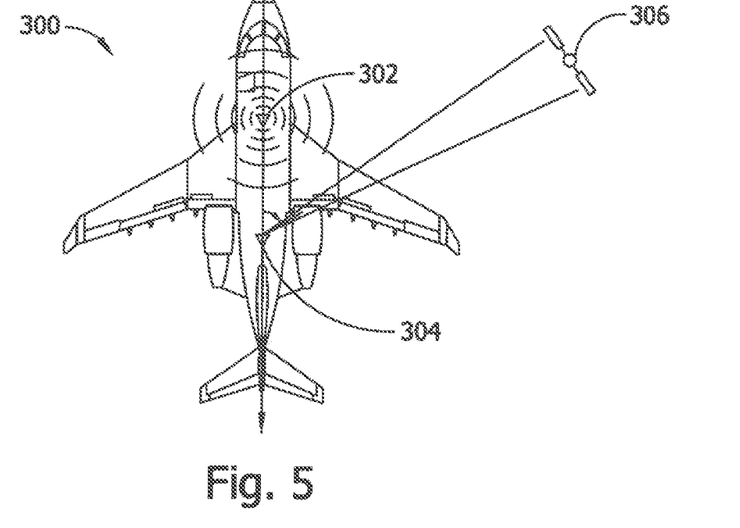
FIG. 5 is a top view of an aircraft illustrating relative directional orientations of two co-located radio systems.
Figure 6:
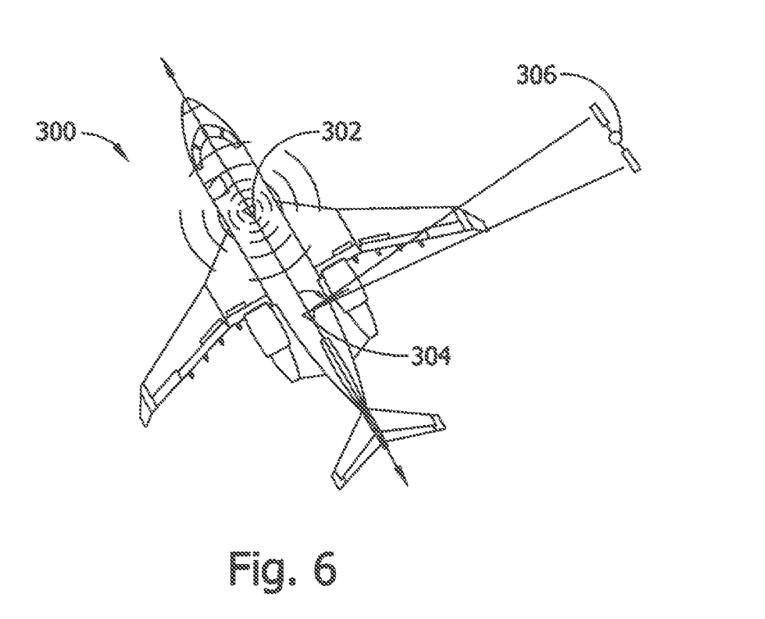
FIG. 6 is another top view of the aircraft illustrating a change in the relative directional orientations of the two co-located radio systems illustrated in FIG. 5.

However, the effectiveness of such a cosite mitigation system may be reduced when the relative distance between the two radios changes. The relative distance between two co-located radios may change, for example, when they are installed on a vehicle (e.g., aircraft and generally static airframe). In certain situations, a slightly misaligned value may disproportionately/severely degrade the mitigation effectiveness. Referring generally to FIGS. 5 and 6, an aircraft 300 having two co-located radios is illustrated. The first radio may include a generally upward-facing radio antenna (e.g., an IRIDIUM antenna), referred to as the first antenna 302. The second radio may include a steerable antenna (e.g., an INMARSAT antenna), referred to as the second antenna 304, configured for transmitting a generally concentrated signal beam towards a fixed location 306 (e.g., a geostationary satellite). As the aircraft 300 changes its position during flight (e.g., turns, ascends, descends or the like), the second antenna 304 may steer/rotate its signal beam accordingly in order to maintain its communication to the fixed location 306.

Rotation of the second antenna 304 relative to the first antenna 302 may change the relative distance and produce phasing errors between the first and the second radios. These phasing errors may be significant at L-Band (e.g., when half lamda is approximately 0.32 feet, or 0.1 meters) and/or other carrier frequencies when utilized on an aircraft. For instance, if the cosite interference mitigation system is installed and configured for a certain antenna position, the effectiveness of the cosite mitigation system may be reduced when the directional orientation of the second antenna 304 changes during flight. Positional changes of a high gain antenna (the second antenna 304 in this example) may introduce significant deviation resulting in several cycles of phase shifts and producing undesirable behaviors. Therefore, the phase shift value determined for the antenna position during initial configuration may need to be compensated/adjusted based on the positional changes of the second antenna 304 during flight.

The interference mitigation system of the present disclosure is configured for providing variable radio frequency (RF) delays to effectively mitigate cosite interferences. The variable RF delays are determined based on positional changes between the initial directional orientation of the second antenna 304 and the current directional orientation of the second antenna 304. Although the following is described within the context of providing radio frequency interference mitigation for an aircraft including at least two radios, the present disclosure is not limited to this scenario. It is to be understood that this may be applied to any vehicle (including, but not limited to, a tank, an automobile, a boat, or a submarine) in any situation where it is desirable to provide radio frequency interference mitigation without departing from the scope of the present disclosure.

Figure 7:
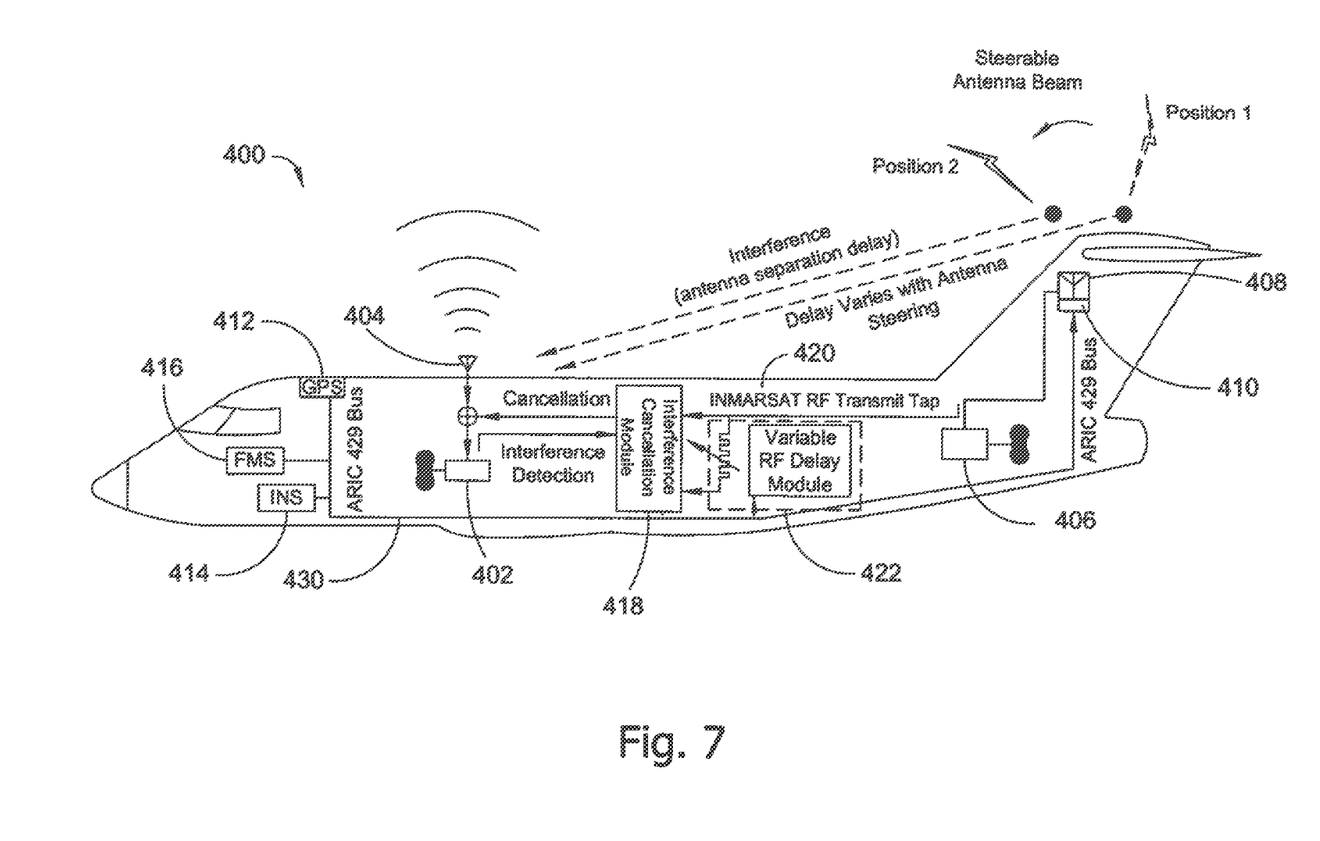
FIG. 7 is a block diagram illustrating a system for mitigating RF interferences.

Referring now to FIG. 7, a vehicle (aircraft) 400 utilizing an interference mitigation system is shown. The aircraft 400 may include two radio systems operating in frequency bands that are relatively close to interfere with each other. The first radio system may include a first radio 402 (e.g., an IRIDIUM radio) communicatively coupled to a first antenna/transmitter 404. The second radio system may include a second radio 406 (e.g., an INMARSAT radio) communicatively coupled to a second antenna/transmitter 408.

In one embodiment, the second antenna 408 may be a rotatable/steerable antenna. The directional orientation of the second antenna 408 may be controlled via a positioning module 410. For example, the positioning module 410 may be communicatively coupled with a Global Positioning System (GPS) 412, an Inertial Navigation System (INS) 414, a Flight Management System (FMS) 416 or the like via a communication bus 430 (e.g., an "ARINC 429" bus or the like). Based on the current position of the aircraft (e.g., provided by the GPS 412) and the current aircraft flight angles (e.g., aircraft roll, pitch and yaw angles provided by the INS 414), the positioning module 410 is able to rotate/steer the second antenna 408 accordingly to maintain the direction of the antenna beam to a particular location (e.g., a selected geostationary satellite).

An interference cancellation module 418 is communicatively coupled with the first radio system. The interference cancellation module 418 is configured for cancelling/mitigating interferences in the signals received at the first antenna 404. For example, the interference cancellation module 418 may be configured to apply a phase shift value to the signals received at the first antenna 404 to mitigate the cosite interferences caused by the second antenna 408. In one embodiment, the phase shift value is determined during an initial configuration by sampling (e.g., based on interference samples received via the second antenna RF transmit tap 420)

the output of the second antenna 408 at its initial directional orientation and matching the output in time delay with the input of the first antenna 404.

The interference cancellation module 418 is also communicatively coupled with a variable RF delay module 422. The variable RF delay module 422 is configured for determining a phase compensation value based on positional changes between the initial directional orientation of the second antenna 408 and the current directional orientation of the second antenna 408. The variable RF delay module 422 is configured to receive positional information of the second antenna 408. In one embodiment, the positional information of the second antenna 408 may be determined based on data received from the GPS 412, the INS 414 and/or the FMS 416 via the communication bus 430 as previously described. The variable RF delay module 422 may then determine whether the current directional orientation of the second antenna 408 has changed in comparison to the initial directional orientation of the second antenna 408. It is understood that the positional information of the second antenna 408 may be provided by any system that may govern the position of the second antenna 408. Such systems may include, but are not limited to, INS, GPS, FMS or the like. The positional information may also be provided by the second antenna 408 itself. For example, the positioning module 410 may include an embedded GPS, which may provide positional information of the second antenna 408 to the variable RF delay module 422.

In one embodiment, the phase compensation value is determined based on the current directional orientation of the second antenna 408 in comparison to the initial directional orientation of the second antenna 408. For example, if the current directional orientation of the second antenna 408 is substantially the same as the initial directional orientation of the second antenna 408, then no phase compensation may be necessary. In such cases, the predetermined phase shift value (determined during the initial configuration described above) may be applied to the signals received at the first antenna 404 to mitigate cosite interferences caused by the second antenna 408. However, if the current directional orientation of the second antenna 408 is different from the initial directional orientation of the second antenna 408, a phase compensation value may need to be determined to compensate and/or replace the predetermined phase shift value.

Figure 8:
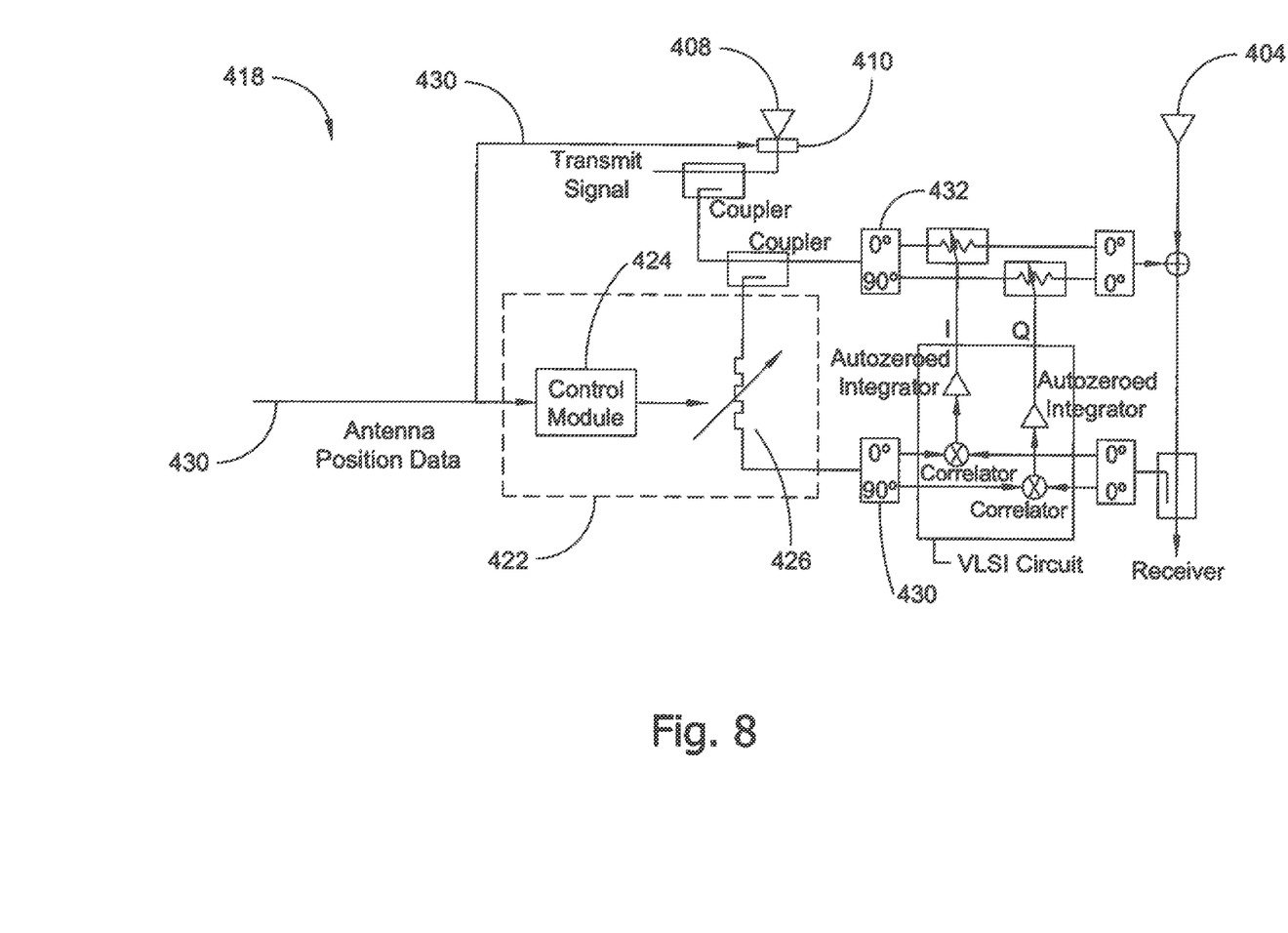
FIG. 8 is a block diagram illustrating an interference cancellation module and a variable RF delay module for utilization with the system illustrated in FIG. 7.

Referring now to FIG. 8, an exemplary circuitry depicting the interference cancellation module 418 and the variable RF delay module 422 is shown. The cancellation module 418 may be configured based on any cosite interference cancellation technology, such as that disclosed in: *Self-calibrating Hybrid Analog CMOS Co-site Interference Canceller*, F. J. Kub et al., Military Communications Conference Proceedings, 1051-1054 vol. 2 (1999). The variable RF delay module 422 may comprise a control module 424 for determining the phase compensation value based on the current directional orientation of the second antenna 408.

The control module 424 may be implemented as an application-specific integrated circuit (ASIC), a microprocessor, or a lookup table stored in a read-only memory (ROM, erasable programmable ROM and the like). In one embodiment, the control module 424 may provide a mapping between a set of directional ranges to a set of RF delay values. The control module 424 may identify a directional range that covers (e.g., in terms of (x, y, z) degree ranges) the current directional orientation of the second antenna, and the RF delay value mapped to this directional range may be selected as the phase compensation value. It is contemplated that such a mapping may be generated during a calibration process. For example, the possible directions where the second antenna 408 may point to may be logically divided into a number of directional ranges (e.g., 16 directional ranges). During the calibration process, the second antenna 408 may be pointed to at least one direction within each directional range, and a calibrated phase shift value for each directional range may be determined. The difference between the calibrated phase shift value and the predetermined phase shift value (the phase shift value determined during the initial configuration, as described above) may then be calculated and recorded as the compensation value for each directional range.

Figure 9:
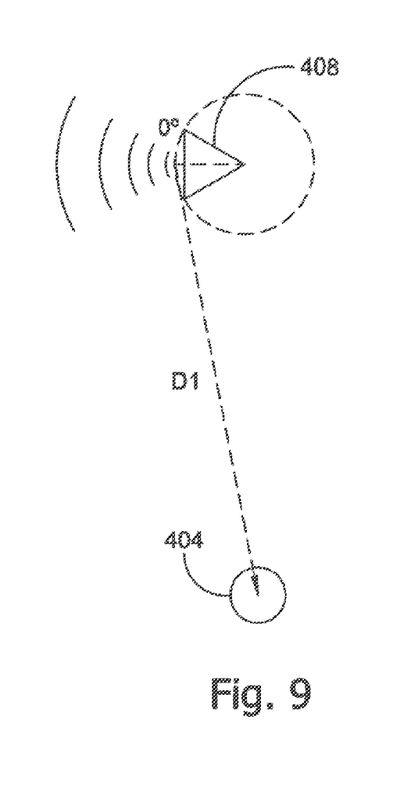
FIG. 9 illustrates an initial distance between a first antenna and a second antenna when the second antenna is oriented in an initial directional orientation.

In another embodiment, instead of mapping a set of RF delay values to a set of directional ranges, the RF delay value may be determined at least partially based on a calculated distance between the first antenna 404 and the second antenna 408. The relationship between the directional orientations of the second antenna 408 and the distances between the two antennas may be illustrated in FIGS. 9 through 12. For illustrative purposes, suppose the rotational diameter of the second antenna 408 is 0.30 meters, and the initial directional orientation of the second antenna 408 is that depicted in FIG. 9, the initial distance between the two antennas may be measured accordingly. If the second antenna 408 rotates a certain degrees clockwise from the initial position (denoted as theta), the new distance between the two antennas may be calculated based on the equation: calculated distance=initial distance+rotational radius×sin(theta).

Figure 10:
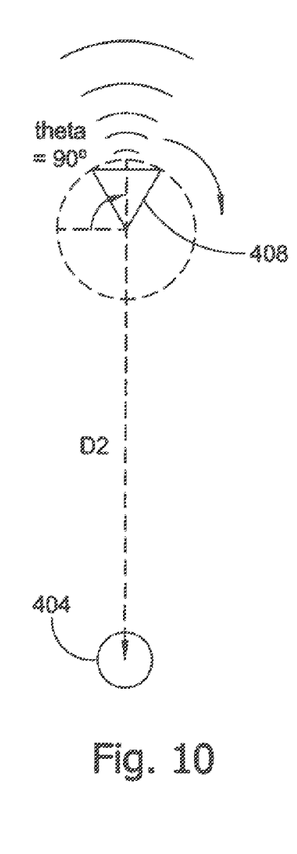
FIG. 10 illustrates a changed distance between the first antenna and the second antenna when the second antenna is rotated 90 degrees clockwise from the initial directional orientation.
Figures 11, 12:
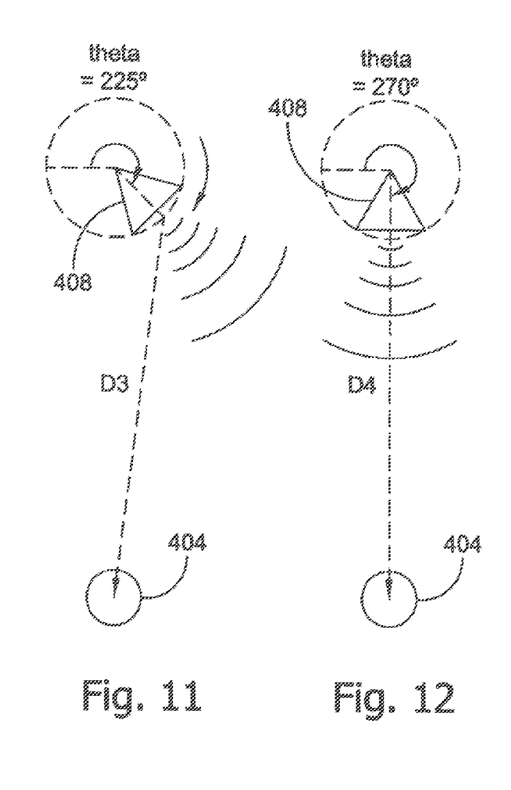
FIG. 11 illustrates another changed distance between the first antenna and the second antenna when the second antenna is rotated 225 degrees clockwise from the initial directional orientation.
FIG. 12 illustrates another changed distance between the first antenna and the second antenna when the second antenna is rotated 270 degrees clockwise from the initial directional orientation.

In the examples depicted in FIGS. 9 through 12, if the second antenna 408 rotates 90 degrees clockwise from the initial position (as shown in FIG. 10), the new distance between the two antennas may be calculated as: initial distance+0.3×0.5×sin(90). Similarly, if the second antenna 408 rotates 225 degrees clockwise from the initial position (as shown in FIG. 11), the new distance between the two antennas may be calculated as: initial distance+0.3×0.5×sin(225); and if the second antenna 408 rotates 270 degrees clockwise from the initial position (as shown in FIG. 12), the new distance between the two antennas may be calculated as: initial distance+0.3×0.5×sin(270). It is understood that the degrees of rotations illustrated in FIGS. 9 through 12 are merely exemplary; the second antenna 408 is rotatable to various other positions not shown in the figures. It is also understood that the equation utilized for calculating the new distance is exemplary; various other equations for calculating the new distance based on the initial distance and the degree of rotation may be utilized without departing from the spirit and scope of the present disclosure.

Once the distance between the first antenna 404 and the second antenna 408 is calculated, the control module 424 may determine the amount of RF delay necessary to cancel the cosite interferences based on this distance. In one example, the RF delay may be calculated as (new distance÷initial distance)×predetermined phase shift value. In another example, a delay coefficient may be determined and utilized for calculating the RF delay. For instance, if the delay coefficient is determined to be 3.3 ns/meter, then a distance of 6 meters between the two antennas may require about 6×3.3=19.8 ns of RF delay, whereas a distance of 6.15 meters between the two antennas (distance changed due to rotation of the second antenna 408) may require about 6.15×3.3=20.295 ns of RF delay. The difference between the calculated RF delay value and the predetermined phase shift value may be provided to the interference cancellation module 418 as the phase compensation value.

It is contemplated that various other methods may be utilized for determining the appropriate RF delay value based on the current directional orientation of the second antenna 408 without departing from the spirit and scope of the present disclosure. In addition, a feedback module may be provided to further refine the accuracy of the RF delay values.

It is also contemplated that the variable RF delay module 422 may be configured to provide a replacement value (which accounts for both the predetermined phase shift value and the compensation value) instead of the compensation value as previously described. That is, if the variable RF delay module 422 is configured for providing a compensation value, the interference cancellation module 418 may apply phase delays to the signals received at the first antenna 404 by the amount specified in the predetermined phase shift value as well as the amount specified in the compensation value. Alternatively, if the variable RF delay module 422 is configured for providing a replacement value, the interference cancellation module 418 may apply phase delays to the signals received at the first antenna 404 by the amount specified in the replacement value. It is understood that whether to provide the compensation value or the replacement value may be determined based on a particular implementation.

Figure 13:
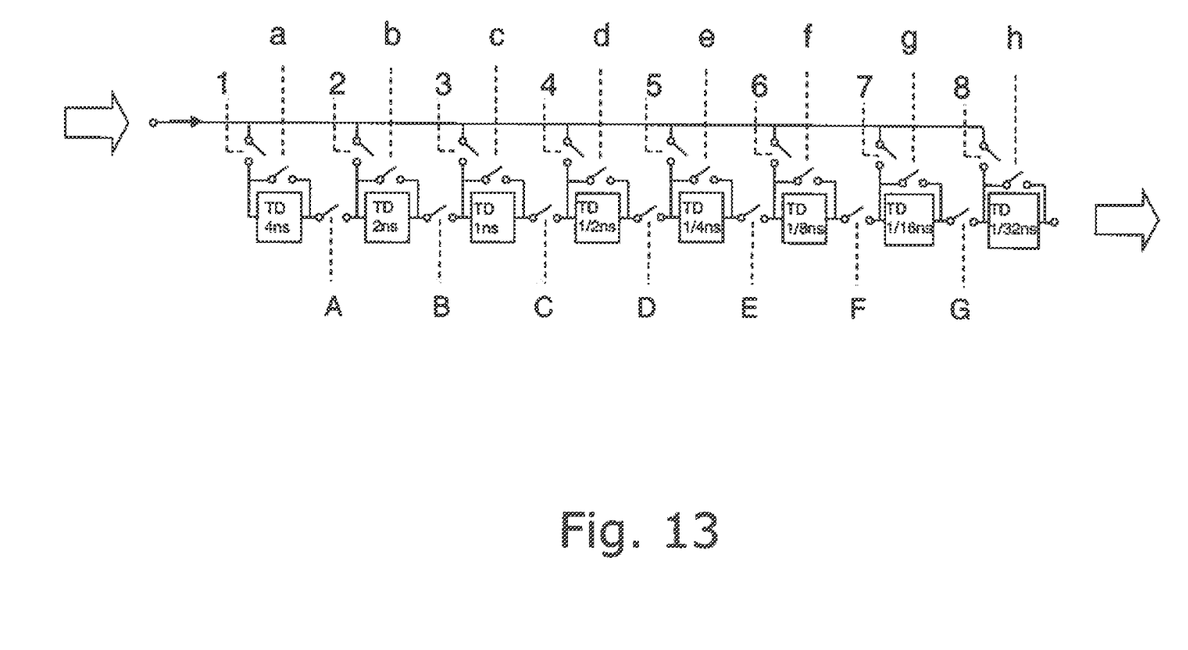
FIG. 13 illustrates an exemplary implementation of a programmable delay line.

The variable RF delay module 422 further comprises a programmable delay line 426 for introducing the phase compensation value (or the replacement value if so configured) to the interference cancellation module 418. FIG. 13 illustrates an exemplary implementation of such a programmable delay line 426. In this exemplary implementation, a set of RF time delay circuits of various durations may be provided, but they may only be engaged conditionally based on control signals received from the control module 424. In this manner, if the control module 424 determines that the appropriated RF delay value should be ⅟₃₂ ns, the control module 424 may engage control line "8" of the programmable delay line 426, which in turn enables only the ⅟₃₂ ns delay circuit in order to provide a ⅟₃₂ ns RF delay. In another example, if the control module 424 determines that the appropriated RF delay value should be ⅟₁₆ ns, the control module 424 may engage control lines "7", "G" and "h" of the programmable delay line 426, which in turn enables only the ⅟₁₆ ns delay circuit to provide a ⅟₁₆ ns RF delay. As another example, if the control module 424 determines that the appropriated RF delay value should be ³⁄₃₂ ns, the control module 424 may engage control lines "7" and "G" of the programmable delay line 426, which in turn enables both the ⅟₁₆ ns and the ⅟₃₂ ns delay circuits to provide a ⅟₁₆+⅟₃₂=³⁄₃₂ ns RF delay.

While the programmable delay line illustrated in FIG. 13 utilizes a set of delay circuits of various durations, it is understood that a set of delay circuits of equal durations may be utilized to implement the programmable delay line. It is also contemplated that any delay line implementation that supports selectively engaging/disengaging one or more delay circuit may be utilized as a programmable delay line. Such delay circuits may include, but are not limited to, RF delays, time delays, various types of phase shifters or the like. In addition, the programmable delay may be introduced to the interference cancellation module 418 at various ports/locations. For example, instead of introducing the programmable delay to port 430 as depicted in FIG. 8, the programmable delay may be introduced to port 432 without departing from the spirit and scope of the present disclosure.

The interference mitigation system of the present disclosure may be further configured for cancelling/mitigating interferences caused by reflections. For example, reflections from the aircraft skin or wing tips may produce delays. Similar to the cosite interferences, the reflected interferences may also vary based upon the directional orientation of the second antenna 408. Therefore, the variable RF delay module 422 of a particular embodiment may be further configured to reduce the effects of reflected interferences based on the positional changes between the initial directional orientation of the second antenna 408 and the current directional orientation of the second antenna 408.

For instance, a lookup table may be generated to provide mappings between a set of directional ranges to a set of reflected interference delay values. As described above, the possible directions where the second antenna 408 may point to may be logically divided into 16 directional ranges. During the calibration process, the second antenna 408 may be pointed to at least one direction within each directional range, and a reflected interference delay value for each directional range may be determined and recorded. Utilizing this lookup table, if the current directional orientation of the second antenna 408 during a flight is within a particular directional range, the corresponding reflected interference RF delay value mapped to this directional range may be selected and utilized by the interference cancellation module 418 to further reduce the effect of reflected interferences.

It is contemplated that the reflected interference lookup table may be implemented as a separate table component with respect to the control module 424. In this manner, the interference cancellation module 418 may selectively activate either one of the direction-based cosite mitigation feature, the direction-based reflection mitigation feature, or both. Alternatively, the reflected interference lookup table may be integrated into the control module 424. For example, the RF delay value mapped to each directional range in the control module 424 may represent the combined RF delay value of the cosite interference delay and the reflected interference delay. This integrated approach may reduce lookup time and simplify the circuitry design.

Figure 14:
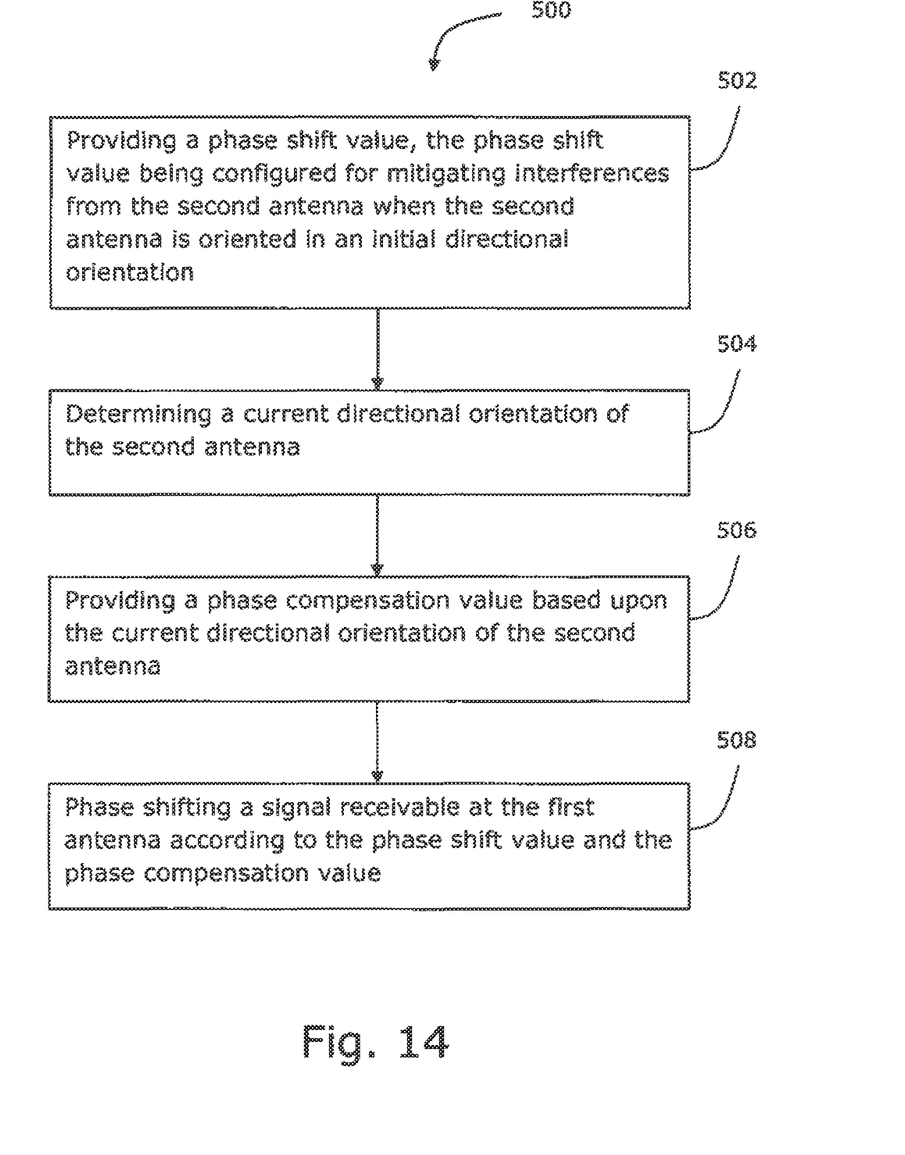
FIG. 14 is a flow chart illustrating a method for mitigating interferences in an RF communication system.

Referring now to FIG. 14, a method 500 for mitigating interferences in an RF communication system in accordance with the present disclosure is shown. The RF communication system includes at least a first antenna and a second antenna. A phase shift value is provided in step 502. The phase shift value is configured for mitigating interferences from the second antenna when the second antenna is oriented in an initial directional orientation. The phase shift value may be a predetermined value or determined during an initial configuration of the RF communication system. In step 504, a current directional orientation of the second antenna is determined. The current directional orientation of the second antenna may be determined based on positional information of the second antenna provided by any system that may govern its position, as previously described.

Step 506 provides a phase compensation value based upon the current directional orientation of the second antenna. For example, the phase compensation value may be determined based on the directional range approach or distance based approach presented above. Once the phase compensation value is determined, step 508 performs phase shifting on the signals received at the first antenna according to the phase shift value and the phase compensation value. It is understood that steps 504 through 508 may be repeated (or continuously executed) for any additional positional changes that may occur.

Figure 15:
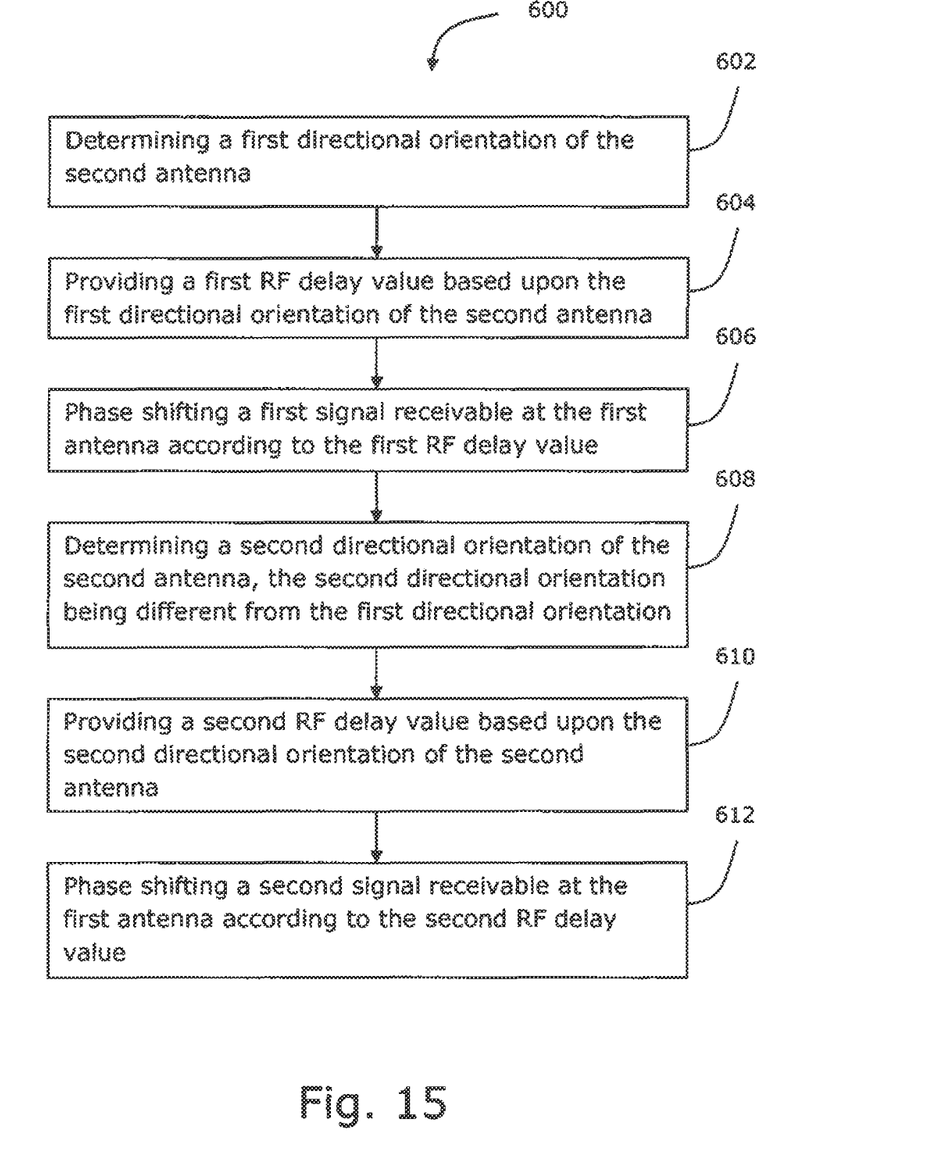
FIG. 15 is a flow chart illustrating another method for mitigating interferences in an RF communication system.

Referring now to FIG. 15; a method 600 for mitigating interferences in an RF communication system in accordance with the present disclosure is shown. Instead of providing a phase compensation value, a replacement value (which accounts for both the predetermined phase shift value and the compensation value) may be provided in this alternative embodiment. In step 602, a first directional orientation of the second antenna is determined. Step 604 then provides a first RF delay value based upon the first directional orientation of the second antenna. Step 606 is configured for applying phase shifting on the signals received at the first antenna according to the first RF delay value when the second antenna is oriented in the first directional orientation.

If the directional orientation of the second antenna is changed relative to the first antenna, step 608 determines a second directional orientation of the second antenna. Step 610 then provides a second RF delay value based upon the second directional orientation of the second antenna. The second RF delay represents a replacement value to be used in place of the first RF delay value, and step 612 applies phase shifting on the signals received at the first antenna according to the second RF delay value when the second antenna is oriented in the second directional orientation. It is understood that steps 608 through 612 may be repeated (or continuously executed) for any additional positional changes that may occur (e.g., for a third directional orientation of the second antenna).

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for mitigating interferences in a radio frequency (RF) communication system, the RF communication system having a first antenna and a second antenna, the method comprising:
    determining a first directional orientation of the second antenna;
    providing a first RF delay value based upon the first directional orientation of the second antenna;
    phase shifting a first signal receivable at the first antenna according to the first RF delay value, the first RF delay value being utilized to mitigate an interference caused by the second antenna when the second antenna is directed towards the first directional orientation;
    determining a second directional orientation of the second antenna, the second directional orientation being different from the first directional orientation;
    providing a second RF delay value based upon the second directional orientation of the second antenna, the second RF delay value being different from the first RF delay value; and
    phase shifting a second signal receivable at the first antenna according to the second RF delay value, the second RF delay value being utilized to mitigate an interference caused by the second antenna when the second antenna is directed towards the second directional orientation.

2. The method of claim 1, wherein the second directional orientation is determined based upon information received from at least one of: a Global Positioning System (GPS), an Inertial Navigation System (INS), a Flight Management System (FMS), and a positioning module configured for steering the second antenna.

3. The method of claim 1, wherein providing a second RF delay value based upon the second directional orientation of the second antenna further comprises:
    identifying a directional range covering the second directional orientation of the second antenna; and
    determining the second RF delay value based upon the directional range.

4. The method of claim 1, wherein providing a second RF delay value based upon the second directional orientation of the second antenna further comprises:
    determining a distance between the first antenna and the second antenna; and
    calculating the second RF delay value at least partially based upon the distance determined.

5. The method of claim 1, further comprising:
    providing a plurality of delays; and
    selectively engaging at least one of the plurality of delays according to the second RF delay value.

6. The method of claim 1, wherein the first antenna and the second antenna are positioned on a same vehicle, the first antenna and the second antenna are configured to operate independently with respect to each other, the first RF delay value is utilized to mitigate cosite interferences between the first antenna and the second antenna when the second antenna is directed towards the first directional orientation, and the second RF delay value is utilized to mitigate cosite interferences between the first antenna and the second antenna when the second antenna is directed towards the second directional orientation.

* * * * *